United States Patent
Moidu et al.

(10) Patent No.: US 7,952,778 B2
(45) Date of Patent: May 31, 2011

(54) BIAXIAL MEMS MIRROR WITH HIDDEN HINGE

(75) Inventors: Abdul Jaleel K. Moidu, Nepean (CA); Wenlin Jin, Nepean (CA)

(73) Assignee: JDS Uniphase Corporation, Milpitas, CA (US)

( * ) Notice: Subject to any disclaimer, the term of this patent is extended or adjusted under 35 U.S.C. 154(b) by 353 days.

(21) Appl. No.: 12/353,475

(22) Filed: Jan. 14, 2009

(65) Prior Publication Data
US 2009/0180169 A1    Jul. 16, 2009

Related U.S. Application Data

(60) Provisional application No. 61/021,083, filed on Jan. 15, 2008.

(51) Int. Cl.
G02B 26/08    (2006.01)
(52) U.S. Cl. .................................................. 359/198.1
(58) Field of Classification Search ............... 359/198.1, 359/223.1–226.1, 290, 291, 871, 872
See application file for complete search history.

(56) References Cited

U.S. PATENT DOCUMENTS

| | | | |
|---|---|---|---|
| 5,212,582 A | 5/1993 | Nelson | 359/224 |
| 6,533,947 B2 | 3/2003 | Nasiri et al. | 216/2 |
| 6,535,319 B2 | 3/2003 | Buzzetta et al. | 359/225 |
| 6,934,439 B2 | 8/2005 | Mala et al. | 385/18 |
| 6,968,101 B2 | 11/2005 | Miller et al. | 385/18 |
| 7,010,188 B2 | 3/2006 | Miller et al. | 385/18 |
| 7,224,507 B2 * | 5/2007 | Kamiya et al. | 359/290 |
| 2007/0236775 A1 | 10/2007 | Miller et al. | 359/291 |

OTHER PUBLICATIONS

Jung et al, High Fill-Factor Two-Axis Gimbaled Tip-Tilt-Piston Micromirror Array Actuated by Self-Aligned Vertical Electrostatic Combdrives in the Journal of Microelectromechanical Systems, vol. 15, No. 3, pp. 563 to 571, Jun. 2006.

* cited by examiner

*Primary Examiner* — Euncha P Cherry
(74) *Attorney, Agent, or Firm* — Teitelbaum & MacLean; Neil Teitelbaum; Doug MacLean (57) ABSTRACT

A multi-layer hidden hinge and actuator design for high fill factor biaxial MEMS mirror array for wavelength selective switches (WSS) based on a silicon-on-insulator (SOI) process with wafer bonding and coarsely aligned orthogonal vertical comb and/or parallel plate actuator. Each micro-mirror in the MEMS linear piano micro-mirror array comprises a micro-mirror layer, a hinge layer and an electrode/substrate layer. Preferably, the roll and tilt electrodes are substantially disposed along the roll axis to provide a high fill factor. The structure is formed by fabricating the layers separately in SOI structure and then bonding them together.

17 Claims, 10 Drawing Sheets

BIAXIAL MEMS MIRROR WITH HIDDEN HINGE

CROSS-REFERENCE TO RELATED APPLICATIONS

The present invention claims priority from U.S. Patent Application No. 61/021,083 filed Jan. 15, 2008, which is incorporated herein by reference for all purposes.

TECHNICAL FIELD

The present invention relates to a multi-layer stacked micro-electro-mechanical (MEMS) mirror, and in particular to a MEMS mirror pivotable about two orthogonal axes (roll and tilt) with the hinges and the actuator fabricated in a separate layer underneath the mirror, preferably using a staggered orthogonal vertical comb drive actuator that requires only a coarse alignment of comb fingers; however, the design is equally applicable for parallel plate or a combination of comb and parallel plate actuators, with the roll and tilt actuators generally aligned along the roll axis to provide a high fill factor.

BACKGROUND OF THE INVENTION

Conventional hidden hinge MEMS mirrors, such as those disclosed in U.S. Pat. No. 5,212,582 issued May 18, 1993 in the name of William Nelson, and U.S. Pat. No. 6,535,319 issued Mar. 18, 2003 in the name of Victor Buzzetta et al, include a mirror mounted on the end of a pedestal, extending from a substrate, which are rotatable about a single axis and actuated by electrodes patterned on the substrate below each side of the mirror. In an effort to provide biaxial rotation, Nasiri et al, disclose a MEMS mirror with a complicated hidden lever system, in U.S. Pat. No. 6,533,947 issued Mar. 18, 2003. Unfortunately, the device disclosed in Nasiri et al requires four independent levers and four sets of electrodes equally spaced 90° from each other beneath the mirror, thereby requiring a mirror with a large surface area. Furthermore, an array of such mirrors could not be tightly packed together for reflecting individual wavelengths of light, which has been dispersed in an optical switch. Jung et al disclose a somewhat higher fill factor micro-mirror in an article entitled: "High Fill-Factor Two-Axis Gimbaled Tip-Tilt-Piston Micromirror Array Actuated by Self-Aligned Vertical Electrostatic Combdrives in the Journal of Microelectromechanical Systems, Vol 15, No. 3, pages 563 to 571, June 2006; however, the actuation thereof requires eight sets of electrodes spaced apart in a square configuration, thereby increasing the required size of each micro-mirror. Moreover, the comb fingers for the tilt electrode extend perpendicular to the tilt axis and require relatively fine finger spacing, e.g. 3 um. Piano-MEMS micro-mirrors, which tilt about two perpendicular axes and can be tightly packed together, are disclosed in U.S. Pat. No. 6,934,439 issued Aug. 23, 2005 in the name of the present Applicant. A hidden hinge version of the piano-MEMS micro-mirrors is disclosed in United States Patent Publication 2007/0236775 published Oct. 11, 2007 in the name of the present Applicant. The aforementioned piano-MEMS devices pivot about a single centrally located post with the use of torsional hinges and a gimbal ring. Since these devices attract the lower surface of the mirrored platform toward the hot electrodes on the substrate, the precision and maximum tilt angle is limited by the size of the mirror.

Future MEMS mirror arrays for wavelength selective switching call for relatively long and stiff (thick) mirrors capable of tilting in two axes, and a relatively high tilt angle. Hidden hinge designs, in which the mirror is fabricated in a layer above the hinge plane, are attractive to reduce mirror mass moment of inertia and chip size, as the mirror need only be about the same size as the optically active area required.

Vertical comb drives provide relatively large electrostatic torque that is required for high tilt angle. Hidden hinges with vertical comb actuators are quite a powerful combination for next generation wavelength selective switches. It is also highly desirable to reduce complexity of vertical comb fabrication process.

An object of the present invention is to overcome the shortcomings of the prior art by providing a biaxially pivoting MEMS micro-mirror device in which the electrode surfaces are separate from the mirrored platform providing a large tilt angle, which is easily controllable and highly accurate. Another object of the present invention is to provide relatively long and thin micro-mirrors, which can be positioned very close together with only an air gap therebetween, by disposing both the roll and tilt electrodes along the same axis.

SUMMARY OF THE INVENTION

Accordingly, the present invention relates to a micro-electro-mechanical device comprising:
 a substrate with first and second supports extending upwardly therefrom;
 a tilting element pivotable about a first axis;
 first hinges, defining the first axis, extending from opposite sides of the tilting element;
 a rolling element, surrounding the tilting element and receiving the ends of the first hinges, pivotable about a second axis perpendicular to the first axis;
 second hinges, defining the second axis, extending from opposite ends of the rolling element, the outer ends of which are fixed to one of the first and second supports;
 a pedestal extending upwardly from the tilting element;
 a reflective body mounted on the pedestal;
 a first electrode mounted on the substrate along the second axis for rotating the tilting element and the reflective body about the first axis; and
 a second electrode mounted on the substrate including a first section along the second axis between the first electrode and the first support and a second section along the second axis between the first electrode and the second support, for rotating the rolling element, the tilting element and the reflective body about the second axis.

Another aspect of the present invention relates to a method of manufacturing a MEMs device comprising:
 a) forming a substrate with first and second electrodes thereon;
 b) forming a middle section on a first wafer handle including:
 a tilting element pivotable about a first axis;
 first hinges, defining the first axis extending laterally from opposite sides of the tilting element;
 a rolling element, pivotable about a second axis perpendicular to the first axis, surrounding the tilting element, and receiving the ends of the first torsional hinge;
 second hinges, defining the second axis, extending longitudinally from opposite ends of rolling element; and
 a mounting platform fixed to each outer end of the second torsional hinge;
 c) forming a reflective body section including a pedestal and a reflective body on a second wafer handle;
 d) mounting the pedestal of the mirror section onto the tilting element of the middle section;

e) removing the first wafer handle from the middle section;

f) mounting the mounting platforms of the middle section onto opposite ends of the substrate section suspending the tilting and rolling elements above the first and second electrodes, respectively; and g) removing the second handle wafer of the reflective body section.

BRIEF DESCRIPTION OF THE DRAWINGS

The invention will be described in greater detail with reference to the accompanying drawings which represent preferred embodiments thereof, wherein:

FIG. 2b is a plan view of the electrode configuration of FIG. 2a;

DETAILED DESCRIPTION

Figure 1A:
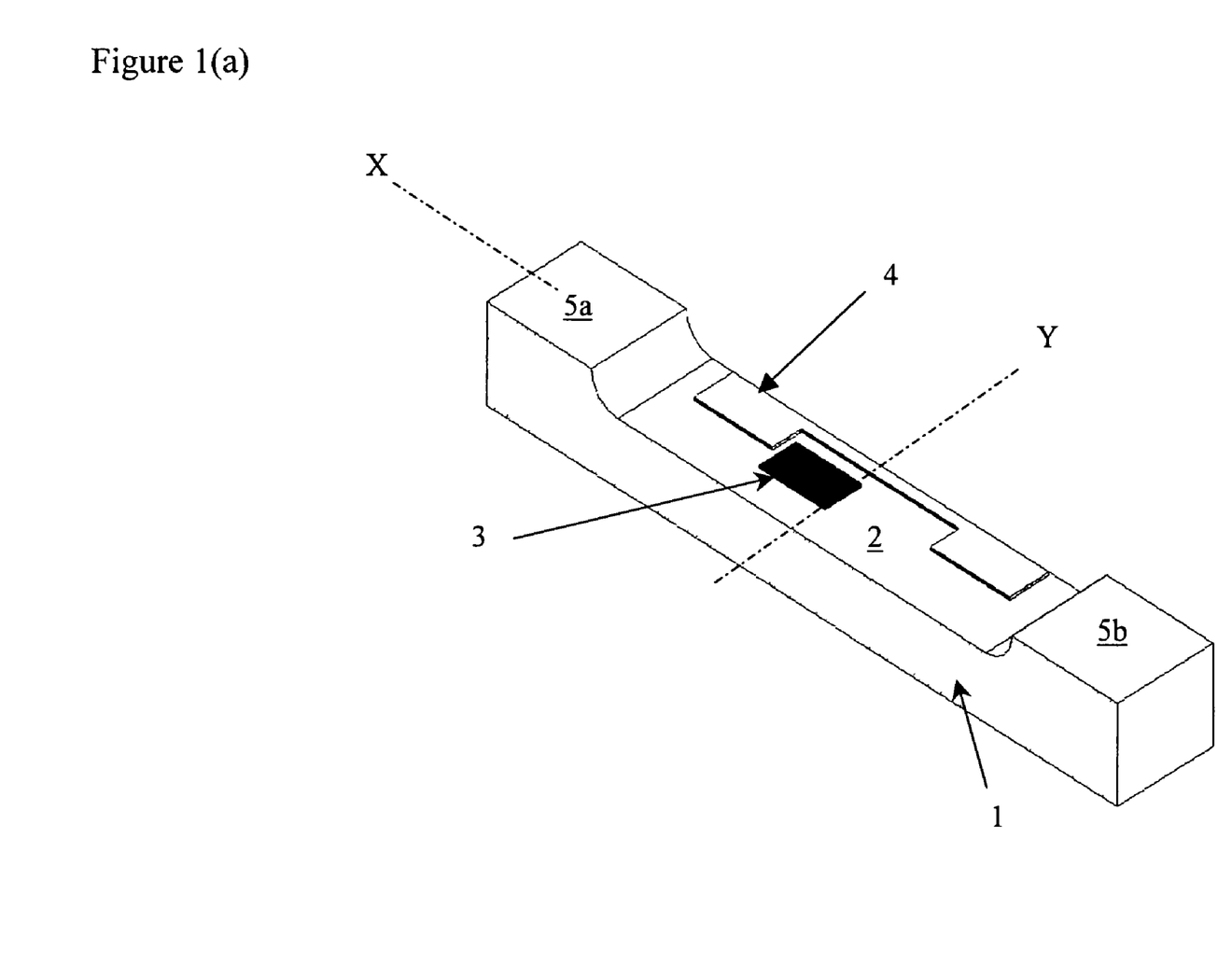
FIG. 1a is an isometric view of an electrode configuration of a first embodiment of the present invention.

With reference to FIG. 1a, the first embodiment of the device of the present invention includes a substrate wafer 1, e.g. glass or silicon, formed with a valley section 2 and raised supports 5a and 5b at opposite ends thereof. The substrate wafer 1 is patterned with a rectangular-shaped Y (or tilt) electro-static electrode 3, generally along and symmetrical about the longitudinal X-axis of the device and on one side of the lateral Y-axis of the device, and a C-shaped X (or roll) electro-static electrode 4 extending along one side of the valley section 2, i.e. on one side of the longitudinal X axis and on both sides of the lateral Y axis, symmetrical thereto. The roll electrode 4 includes two large sections, one on opposite sides of the y-axis, and a thin trace section extending therebetween, providing an area for the tilt electrode 3 to be located between the large sections of the roll electrode 4. Each of the large sections is arranged between the tilt electrode 3 and one of the raised end supports 5a or 5b, and connected through the middle by the elongated trace section, which is thinner than the large sections, and which extends beneath the side of the mirror corresponding to the roll electrode 4. A crucial aspect in elongated mirror array is that leverage for the roll torque is limited, hence a large electrode area is required to achieve the desired electrostatic torque. With the roll electrode structure shown, the available space for the roll electrode in the elongated mirror array is used efficiently and effectively, and achieves the required roll angle for a given voltage. Moreover, the structure of the roll and tilt electrodes 3 and 4 eliminates any undesired tilt induced by the actuation of the roll electrode 4. A second tilt electrode 3 can be provide on the opposite side of the Y-axis for increasing the control and the range of motion, but use of only a single roll electrode takes up less space, enabling the tilting mirror to remain relatively thin. Positioning the first and second electrodes along the X axis enables relatively long and thin mirror structures to be positioned relatively close together with only a small air gap therebetween.

Figure 1B:
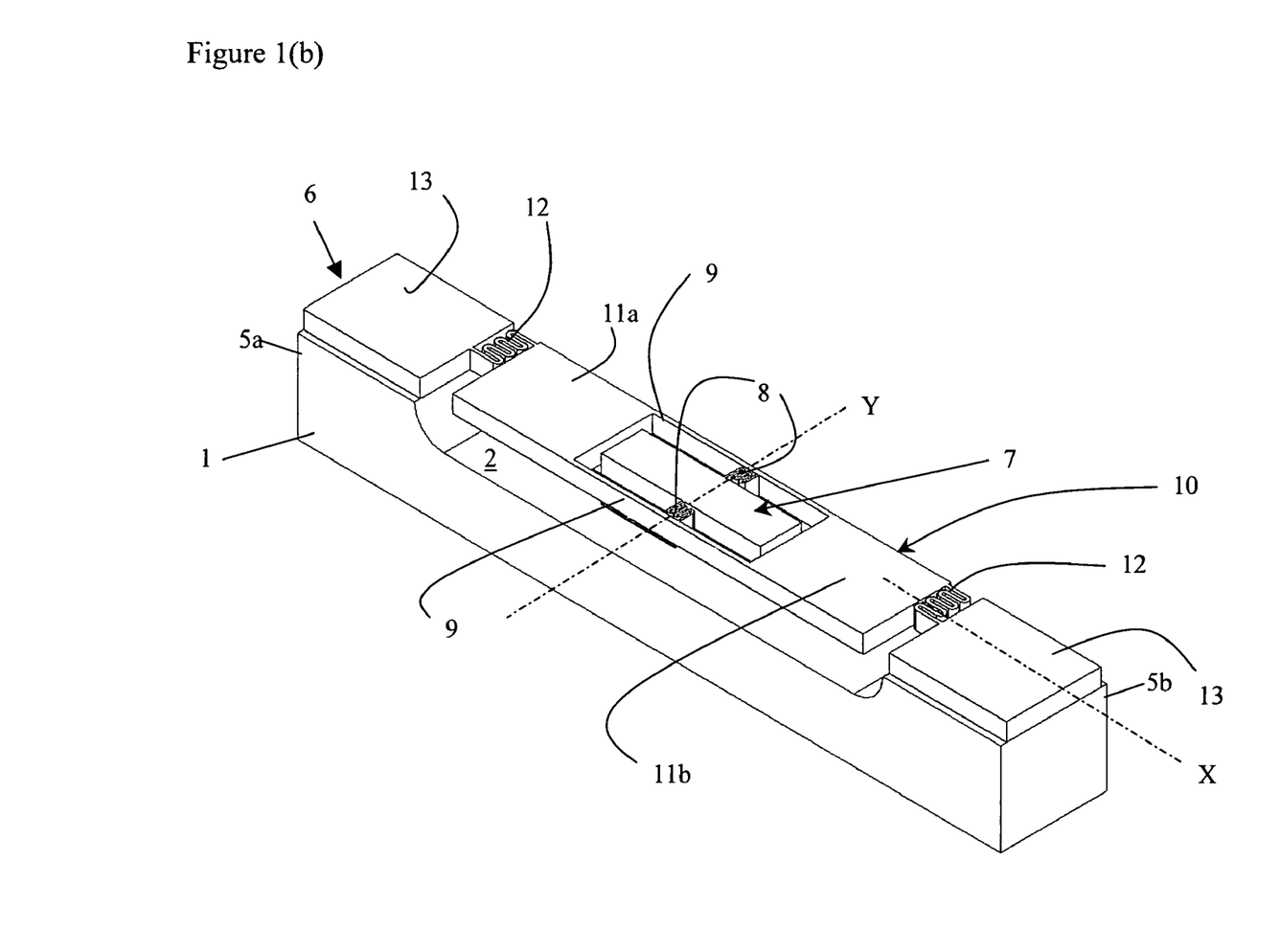
FIG. 1b is an isometric view of a hinge structure of the first embodiment of the present invention.

With reference to FIG. 1(b), a ground electrode/hinge wafer 6, processed independent of the substrate wafer 1, is bonded at each end thereof onto the supports 5a and 5b of the substrate wafer 1, suspending the remaining electrode/hinge structure above the valley section 2 of the substrate wafer 1. The electrode/hinge wafer 6 includes an inner, tilting, rectangular ground element or platform 7 pivotable about the lateral Y axis defined by laterally extending torsional tilt (piano) hinge 8. The tilt hinge 8 is ideally comprised of two serpentine beams, each with high aspect ratios, e.g. greater than ten, providing relatively low resistance to rotation about the Y-axis, but relatively higher resistance to rotation about the X-axis. The outer ends of the tilt hinge 8 are fixed to cross braces 9 proximate the lateral Y axis. The tilt electrode 3 is disposed below one side of the tilting ground platform 7, i.e. on one side of the Y-axis for attracting the bottom of one side of the tilting ground platform 7.

The cross braces 9 connect outer rolling structures 11a and 11b, e.g. frames or platforms, forming a rolling ground electrode element 10 with ground electrode surfaces for the hot roll electrode 4, which is disposed below one side of both of the rolling structures 11 and below one of the cross braces 9. As a result, the rolling ground electrode element 10 surrounds the tilting ground platform 7. A generally longitudinally extending torsional roll hinge 12 extends from the outer end of each of the rolling structures 11 to mounting platforms 13, which are mounted on the raised sections 5a and 5b of the substrate 1. The roll hinges 12 are ideally comprised of serpentine beams, each with high aspect ratios, e.g. greater than 10, providing relatively low resistance to rotation about the X-axis, but relatively higher resistance to rotation about the Y-axis. The tilting ground element 7 is capable of tilting independently from the rolling ground electrode 10 about the Y-axis, because the tilt hinges 8 extend from the rolling ground electrode 10 and do no resist rotation about the Y-axis. The entire rolling ground electrode 10 along with the tilting ground platform 7 tilt together about the X-axis via roll hinges 12, because the tilt hinges 8 resist rotation of the tilting element 7 about the X-axis relative to the rolling ground electrode 10. The roll hinges 12 also acts as an electrical connection between ground and external bond pads.

Figure 1C:
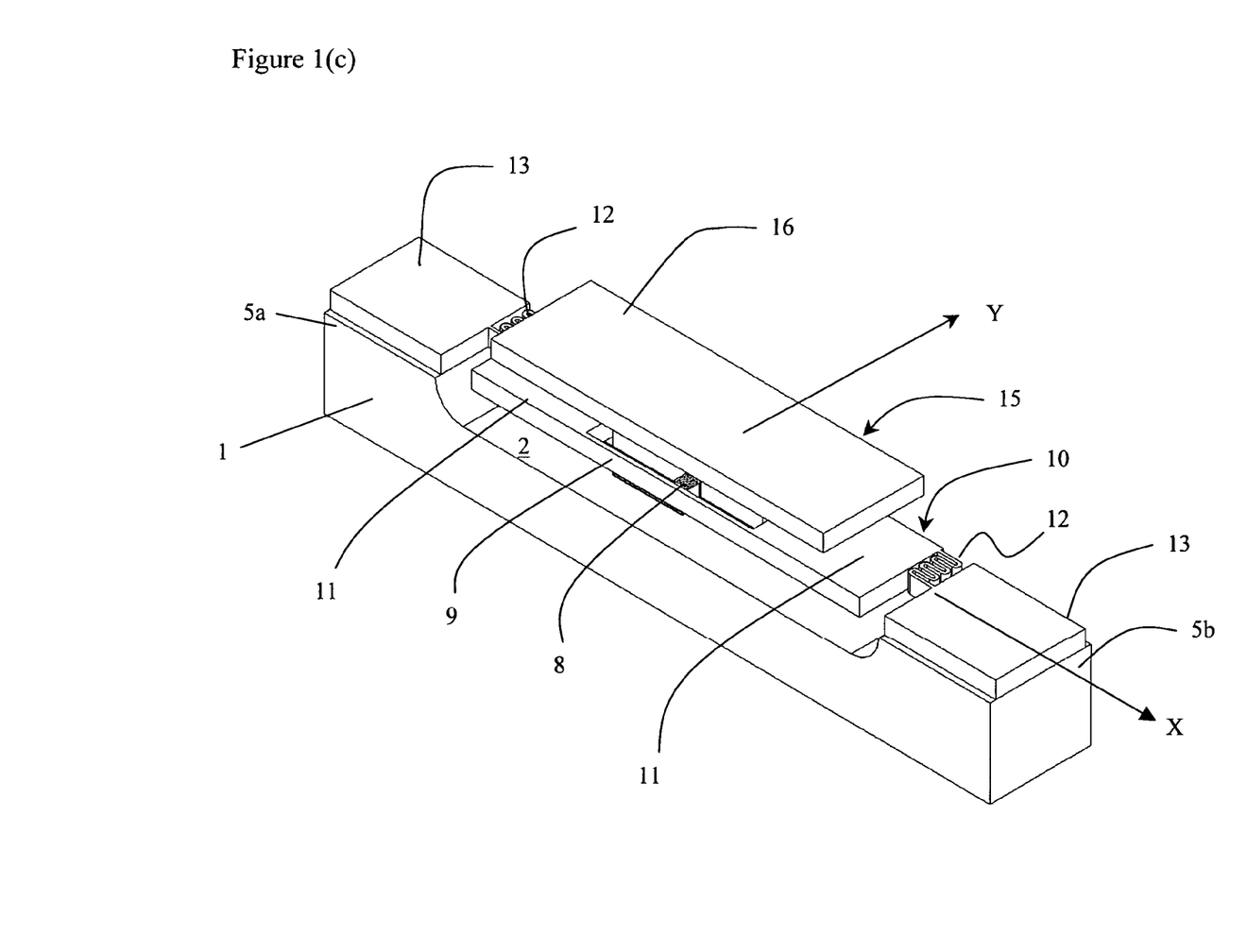
FIG. 1c is an isometric view of the MEMS device according to the first embodiment of the present invention.
Figure 1D:
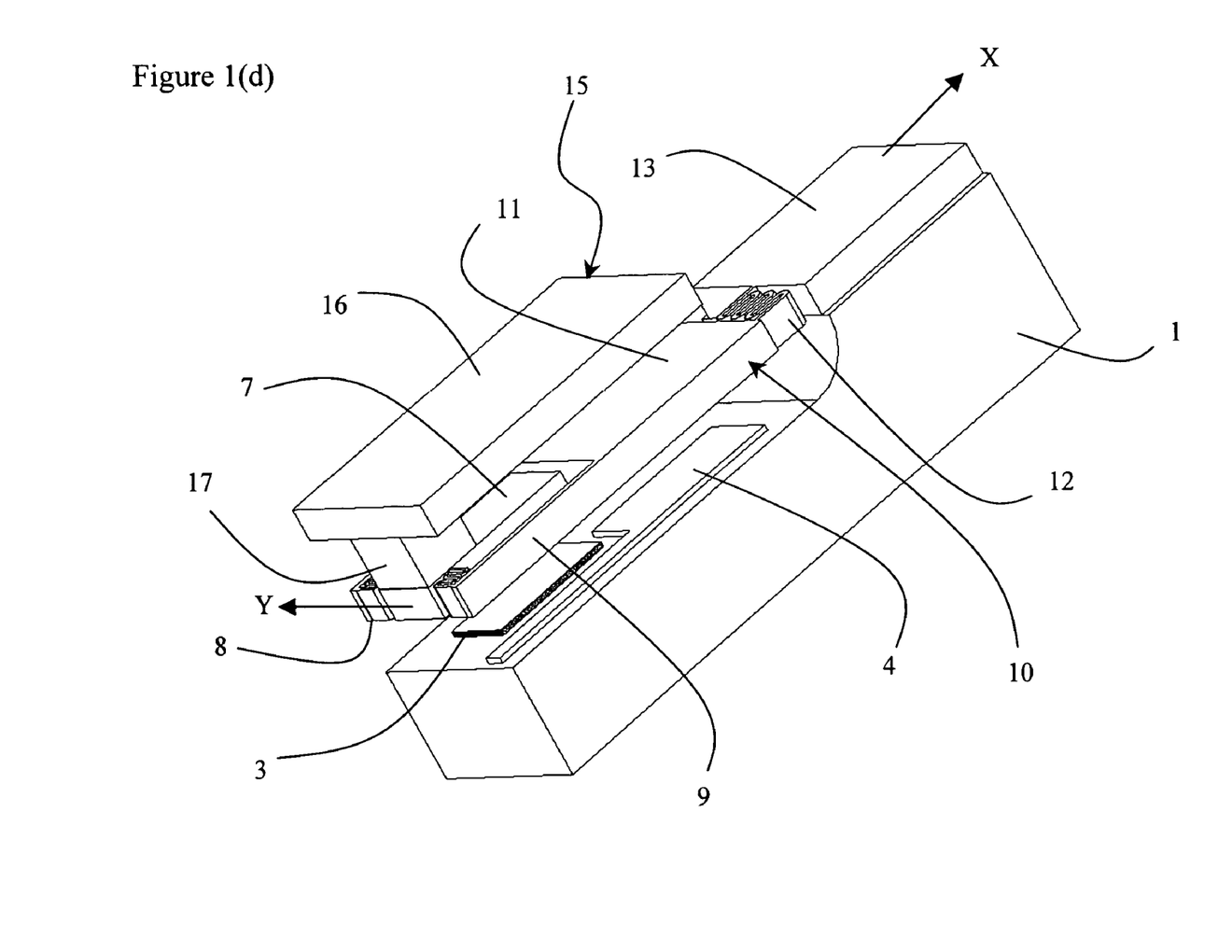
FIG. 1d is a cross-sectioned isometric view of the MEMS device of FIG. 1c.

With reference to FIGS. 1c and 1d, a mirror 15 is patterned separately from the ground electrode/hinge wafer 6 and the substrate wafer 2 with an upper mirrored platform 16 and pedestal 17 extending downwardly therefrom, which in turn is bonded onto the tilting ground platform 7. The mirror wafer 15 may have stiffening features such as ribs or bulkheads extending between the pedestal 17 and the mirror 16, if required. Ideally, a plurality of the MEMS devices are positioned adjacent each other with only a small air gap therebetween for redirecting individual sub-beams from a dispersed beam of light, as disclosed in U.S. Pat. No. 6,934,439 issued Aug. 23, 2005 in the name of Mala et al of JDS Uniphase Inc, which is incorporated herein by reference.

When a potential is applied to the tilt electrode 3 relative to ground, the electrostatic force of attraction between one side of the tilting ground platform 7 and the tilt electrode 3 causes the tilting ground platform 7 and the mirror 15 to tilt, relative to the rolling ground electrode 10, about the Y-axis via tilt hinge 8. Similarly when a potential is applied to roll electrode 4 relative to ground, the electrostatic force of attraction between one side of the rolling ground electrode 10 and the roll electrode 4 causes the entire suspended portion of the ground layer 6, including the rolling ground electrode 10 and the tilting ground platform 7 along with the mirror wafer 15, to tilt about the outer roll hinges 12, i.e. the X axis. The angular position of the tilting ground platform 7 and accordingly the mirror 16 can be adjusted according to the amount of voltage applied to the tilt electrode 3 for redirecting a sub-beam of light incident on the mirror 16 to any one of a plurality of output ports, as is well known in the art of optical switching. To prevent the sub-beam from momentarily being transmitted to an output port physically in between the original output port and the new output port, the roll electrode 4 is activated to rotate the mirror 16 out of alignment with any of the output ports until the tilt electrode 3 is activated to tilt the mirror 16 to the correct angle corresponding with the desired output port. Then the roll electrode 4 is deactivated bringing the rolling ground electrode 10 back into the rest position with the tilting ground electrode 7 tilted at the correct angle corresponding to the desired output port. Suitable electrode configurations are disclosed in U.S. Pat. No. 6,968,101 issued Nov. 22, 2005, and U.S. Pat. No. 7,010,188 issued Mar. 7, 2006 both in the name of Miller et al to JDS Uniphase Inc, which are incorporated herein by reference.

With reference to FIGS. 2*a* to 2*e*, which illustrate a second embodiment of the present invention, the multi-layer design, according to the present invention, is alternatively implemented with vertical comb drives, instead of electro-static electrodes. The vertical comb drives provide relatively large electrostatic torque without suffering from pull-in instability phenomenon, enabling relatively high controllable angular range. Vertical comb drives are comprised of inter-digitized sets of rotor (moving) and stator (stationary) vertically extending fingers or teeth that are offset from each other in the vertical plane. Torque is generated due to vertical electrostatic force between rotor and stator combs when a potential difference is impressed upon them.

Conventionally the rotor and stator combs are tightly spaced, e.g. 4 um apart, therefore a relatively small lateral misalignment, e.g. >1 um, could result in an electrostatic force perpendicular to the fingers which may lead to lateral instability and collapse of the fingers. Accordingly, a precise lateral alignment, e.g. <1 um, is normally required for the fingers, which is challenging from a fabrication view point.

Moreover, in the case of high fill factor mirror arrays, there is an added consideration of in-plane mirror rotation about the tilt hinge and possible interaction with adjacent mirrors, as lateral spacing between mirrors is typically small, e.g. between 10 um and 5 um or less. There is also a wavelength shift associated with such lateral mirror rotation, which is a key consideration for tilt electrodes as the in-plane rotational stiffness of the tilt hinges is lower than that of the roll hinges. For small finger spacing, e.g. 4 um, this consideration calls for even tighter finger alignment, e.g. <0.25 um, therefore a rather complex self-aligned mask fabrication process would be required.

One possible solution to alleviate lateral interaction of fingers, and at the same time avoid complex self-align mask processes, is to increase the finger spacing, e.g. >10 um, so that a relatively coarse misalignment, e.g. of 2 um or less, is acceptable. However, it is highly desirable to eliminate any lateral rotation, as well as enable somewhat larger finger spacing, e.g. 6 um to 10 um, so that available torque is not compromised greatly.

An orthogonal comb actuator enables relatively coarse alignment of the fingers, and at the same time mostly eliminates lateral mirror rotation. In a vertical comb actuator in accordance with the present invention, comb fingers for tilting the mirror about the tilt axis are fabricated in a plane that is perpendicular to the tilt plane of the mirror, i.e. perpendicular to the tilt axis, therefore the lateral forces don't result in any significant rotation. The orthogonal comb actuator does cause in-plane linear movements; however, these are usually manageable as hinges are relatively strong for these modes of movements.

Figure 2A:
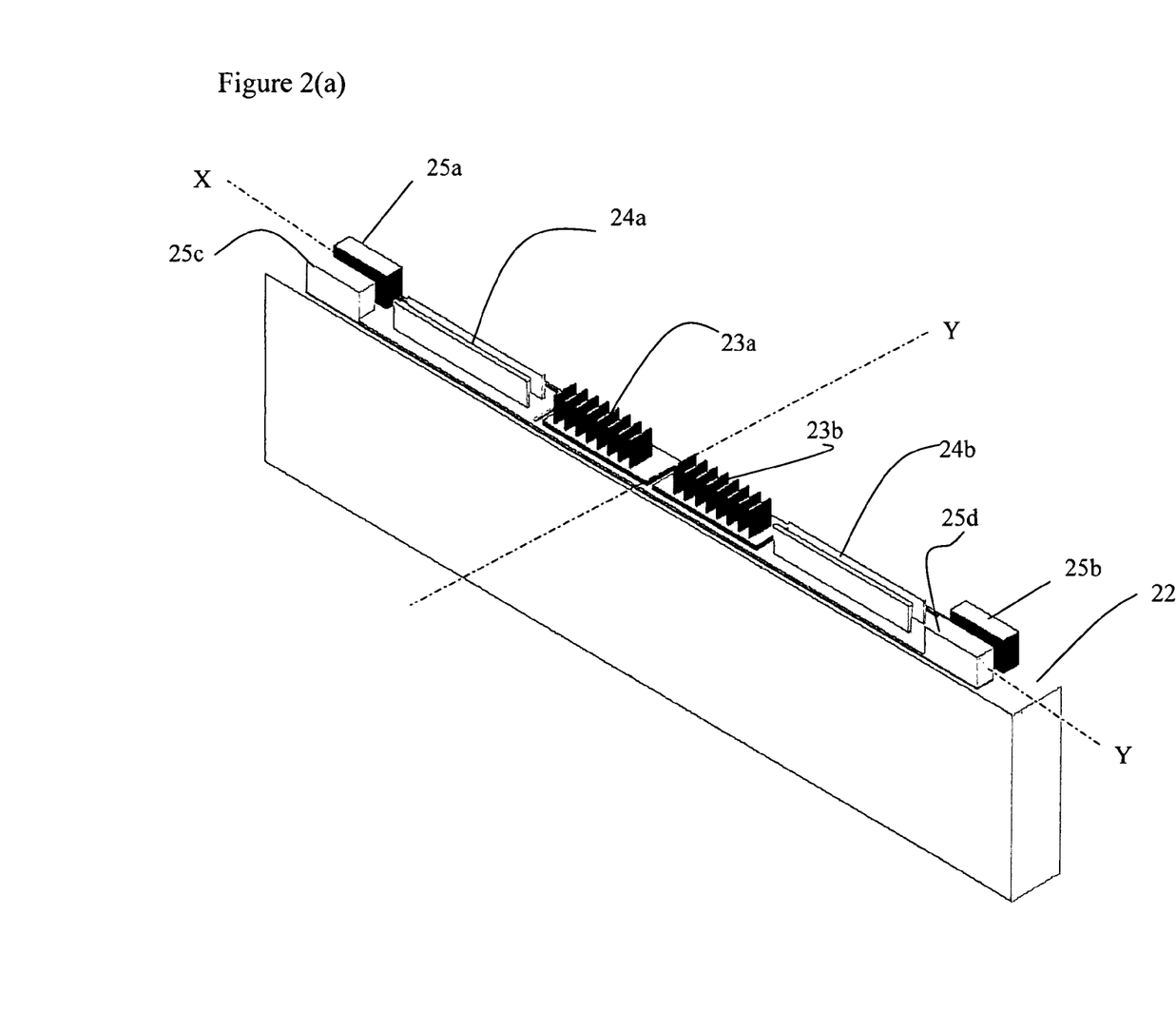
FIG. 2a is an isometric view of an electrode configuration of a second embodiment of the present invention.
Figure 2B:
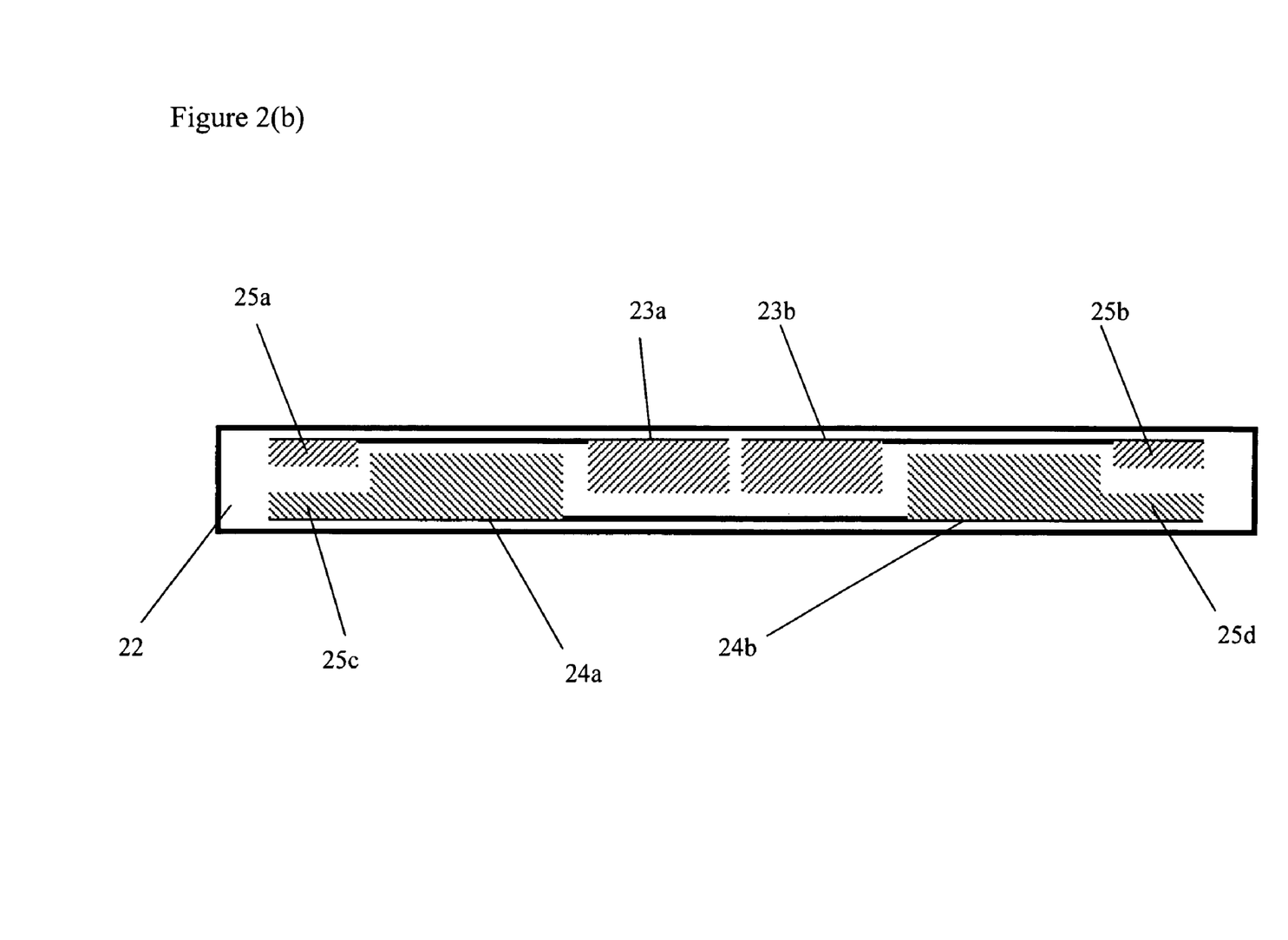

FIGS. 2*a* to 2*e* illustrate an implementation of a multi-layer hidden hinge device in accordance with the present invention along with an orthogonal vertical comb actuator. The first step is to pattern a multi-layer structure, e.g. a SOI structure, to form tilt (Y) and roll (X) stator comb electrodes 23*a*, 23*b* and 24*a*, 24*b*, respectively, which extend vertically upwardly from a substrate 22 (FIG. 2*a*). One or two tilt stator comb electrodes 23*a* and 23*b* can be provided depending on the desired control and range of motion. The first layer is patterned so as to individually address the tilt and roll comb electrodes 23*a*, 23*b* and 24*a*, 24*b* (FIG. 2*b*). One of the tilt stator comb electrodes 23*a* is connected to a first electrode contact 25*a*, while the other tilt stator comb electrode 23*b* is connected separately to a second electrode contact 25*b*. The roll stator comb electrodes 24*a* and 24*b* are connected to third and fourth electrode contacts 25*c* or 25*d* (note that the two segments of the roll electrodes are connected internally), respectively, and each other. The first and third electrode contacts 25*a* and 25*c* form a first raised support at one end of the substrate 22, while the second and fourth electrode contacts 25*b* and 25*d* form a second raised support at the opposite end of the substrate 22.

Preferably, the tilt stator comb electrodes 23*a* and 23*b* are disposed along the X axis, which corresponds to the longitudinal axis of the mirror, with each comb finger symmetrical to the X axis, i.e. the X-Z plane, and parallel to the Y (tilt) axis, i.e. the Y-Z plane or the lateral axis of the mirror. The roll stator comb electrodes 24*a* and 24*b* are also disposed along the X axis, with the first roll stator comb electrodes 24*a* between the first tilt stator comb electrode 23*a* and the first and third electrode contacts 25*a* and 25*c*, and the second roll stator comb electrodes 24*b* between the second tilt stator comb electrode 23*b* and the second and fourth electrode contacts 25*b* and 25*d*. Each comb finger of the roll stator comb electrodes 24*a* and 24*b* is parallel to the X (roll) axis, i.e. the longitudinal axis of the mirror, and perpendicular to the Y (tilt) axis, the lateral axis of the mirror. For roll electrodes, an alternative is the use coarsely aligned standard orientation of combs (i.e. comb finger are parallel to the plane of rotation) or a combination of standards combs and orthogonal combs. This is because the in-plane rotational stiffness of the roll hinges is relatively high.

A ground electrode/hinge wafer 26, processed separately from the vertical comb drive, is bonded at each end thereof onto the first and second raised supports of the substrate wafer 22 (FIG. 2*c*) suspending the remainder of the ground electrode/hinge wafer 26 above the tilt and roll stator comb electrodes 23*a*, 23*b* and 24*a*, 24*b*. The electrode/hinge wafer 26 includes an inner, tilting rotor ground element 27, comprised of first and second structures, e.g. frames, at opposite ends thereof forming tilt rotor comb electrodes 27*a* and 27*b*. The tilting rotor ground comb electrode 27 is pivotable about the lateral Y axis defined by laterally extending torsional ("piano") tilt hinges 28, the outer ends of which are fixed to longitudinal braces 29. The tilt hinges 28 are ideally comprised of two serpentine beams, each with high aspect ratio, e.g. greater than 10, providing relatively low resistance to rotation about the Y-axis, but relatively higher resistance to rotation about the X-axis. The tilt stator comb electrodes 23*a* and 23*b* are disposed below the tilt rotor comb electrodes 27*a* and 27b, respectively, i.e. on opposite sides of the tilt hinges 28 and the Y-axis. Each of the tilt rotor comb electrodes 27a and 27b includes laterally extending cross beams defining rotor comb fingers with slots therebetween offset and interdigitated with the stator comb fingers of the tilt stator comb electrodes 23a and 23b.

Figure 2C:
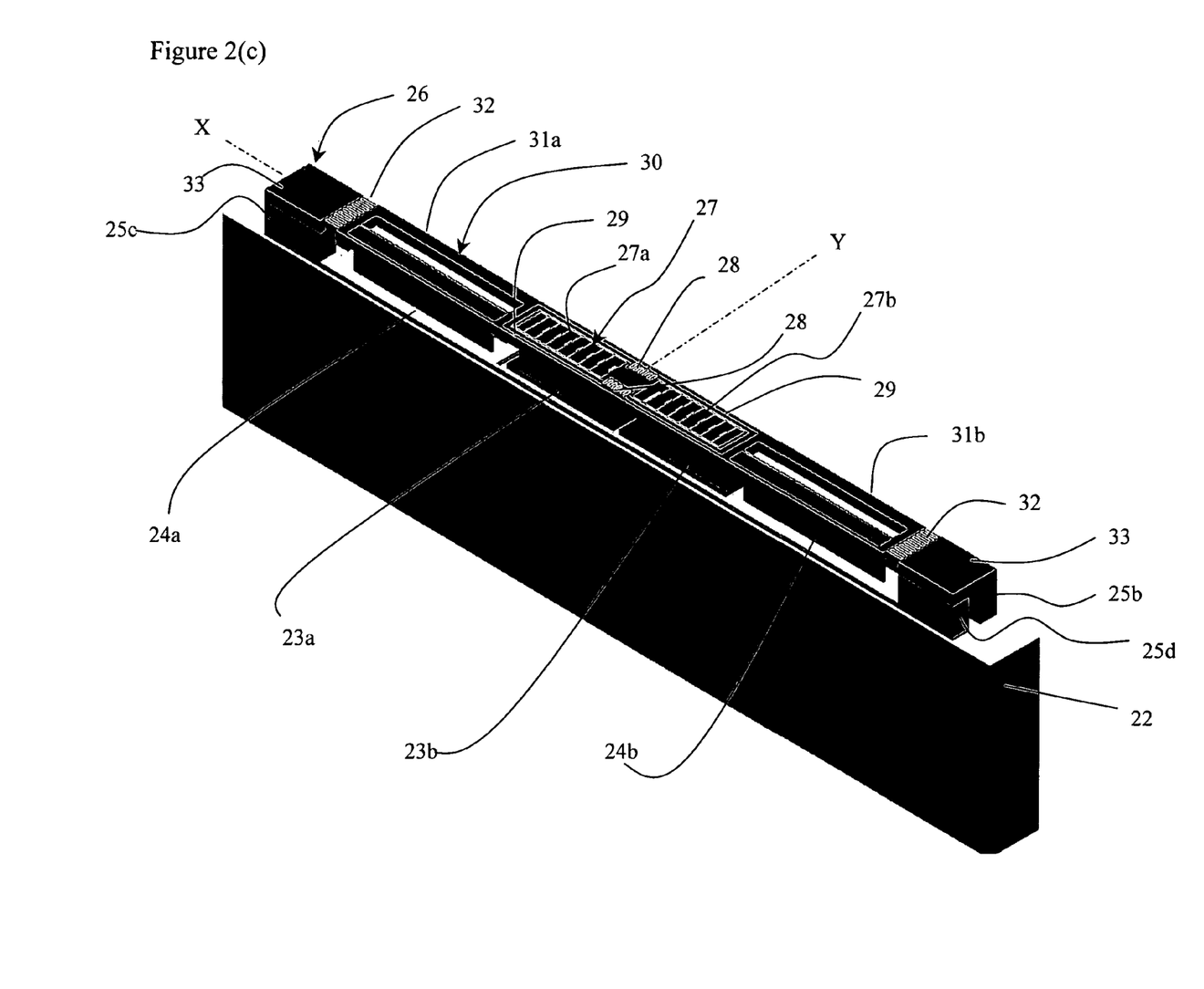
FIG. 2c is an isometric view of a hinge structure of the second embodiment of the present invention.

The longitudinally extending braces 29 connect outer roll rotor comb electrodes 31a and 31b forming a rolling rotor ground element 30 for the roll stator comb hot electrodes 24a and 24b, which are disposed below each of the roll rotor ground elements 31a and 31b, respectively. Each roll rotor comb electrode 31a and 31b includes longitudinally extending beams defining rotor comb fingers with slots therebetween offset from and interdigitated with the stator comb fingers of the roll stator comb electrodes 24a and 24b, respectively. A longitudinally extending torsional roll hinge 32 extends from each end of the rolling rotor comb ground element 30 to mounting platforms 33, which are mounted on the raised supports of the roll and tilt stator comb electrodes 23a, 23b and 24a, 24b, respectively. The roll hinges 32 are ideally comprised of serpentine beams, each with high aspect ratios, e.g. greater than 10, providing relatively low resistance to rotation about the X-axis, but relatively higher resistance to rotation about the Y-axis. The tilting rotor ground element 27 is capable of tilting independently of the rolling rotor ground element 30 about the Y-axis; however, the entire rolling rotor ground element 30 along with the tilting rotor ground element 27 tilt together about the X-axis via roll hinges 32. The roll hinges 32 also act as electrical connection between ground and external bond pads.

Figure 2D:
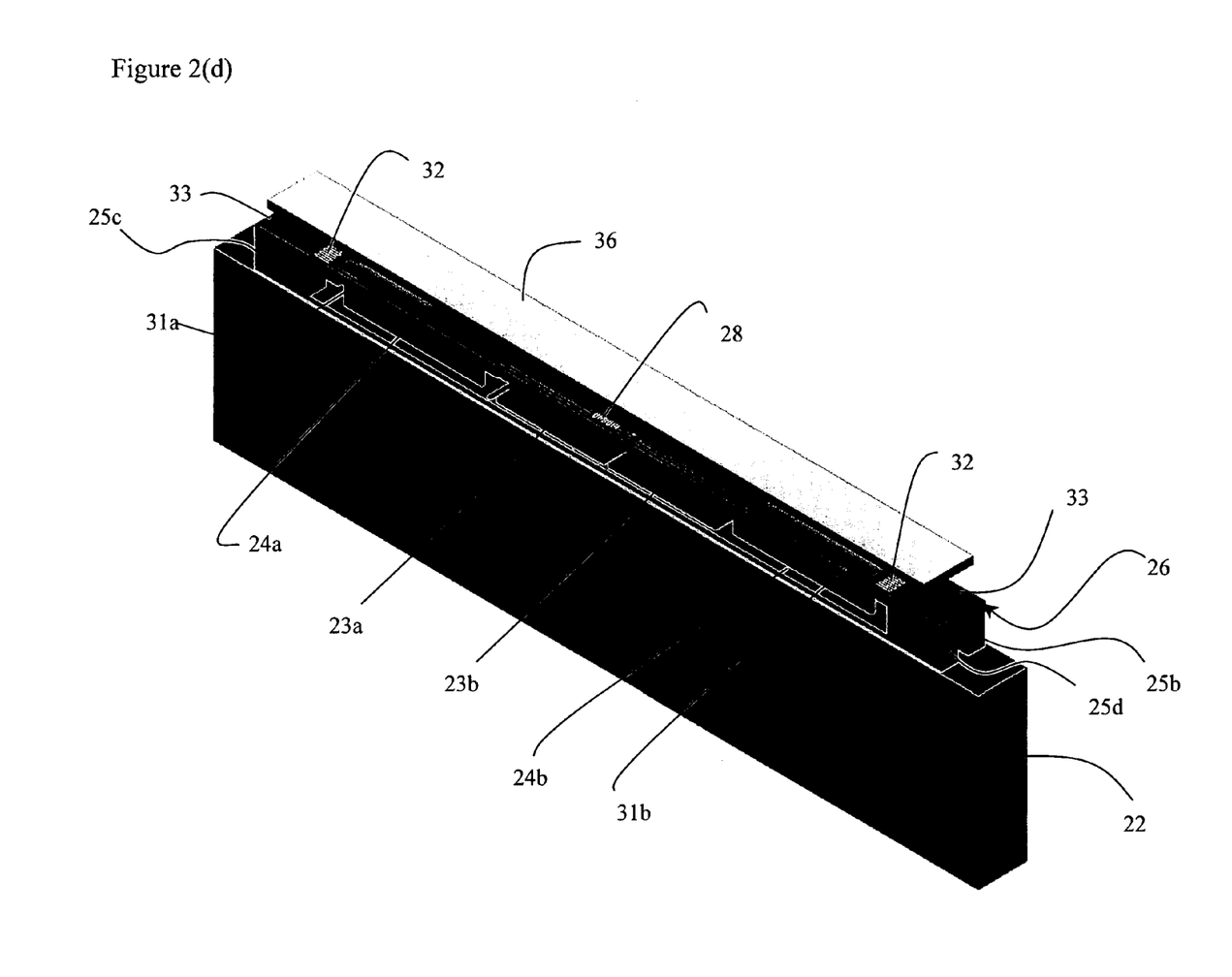
FIG. 2d is an isometric view of the MEMS device according to the second embodiment of the present invention.
Figure 2E:
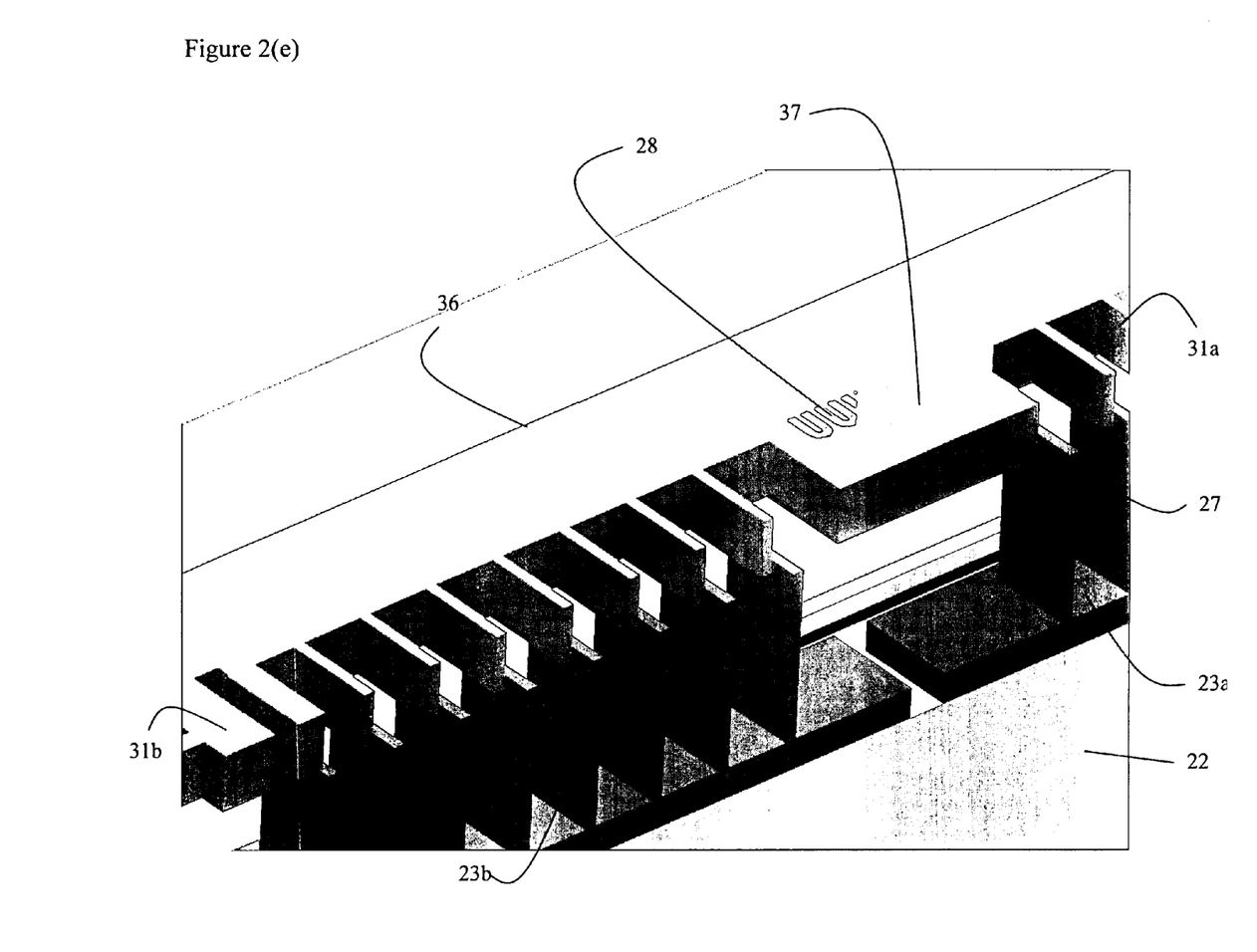
FIG. 2e is a cross-sectioned isometric view of the MEMS device of FIG. 2d.

A mirror 36 is patterned separately with a pedestal 37, which is bonded onto the tilting rotor ground comb element 27 (FIGS. 2d and 2e). The mirror wafer 36 may have stiffening features such as ribs or bulkheads incorporated underneath. The upper surface of the mirror wafer 36 is typically coated with a highly reflective material.

When a potential is applied to one of the tilt stator comb electrodes 23a or 23b relative to ground layer 26, the electrostatic force of attraction between the tilt stator comb electrode 23a or 23b and the corresponding tilt rotor comb electrodes 27a and 27b of the tilting rotor ground comb electrode 27 causes the tilting rotor ground electrode 27 and the mirror 36, connected thereto, to tilt about the tilt hinges 28. Similarly when a potential is applied to the roll stator comb electrodes 24a and 24b relative to ground layer, the electrostatic force of attraction between the roll stator comb electrodes 24a and 24b and the roll rotor ground elements 31a and 31b, respectively, causes the mirror 36 and most of the ground layer 26, including the rolling rotor comb ground electrode 30 and the tilting rotor ground comb element 27 to tilt about the roll hinges 32.

A preliminary method of manufacturing the aforementioned MEMS devices is illustrated in FIGS. 3a to 3f, which utilizes three silicon-on-insulator (SOI) structures 41, 42 and 43 with two (fusion) bonding steps. Each SOI structure 41, 42 and 43 has multiple layers with silicon outer layers sandwiching the insulator (SiO$_2$) layer therebetween. Anodic bonding may also be used provided a pyrex glass layer is deposited prior to bonding.

Figures 3A, 3B, 3C:
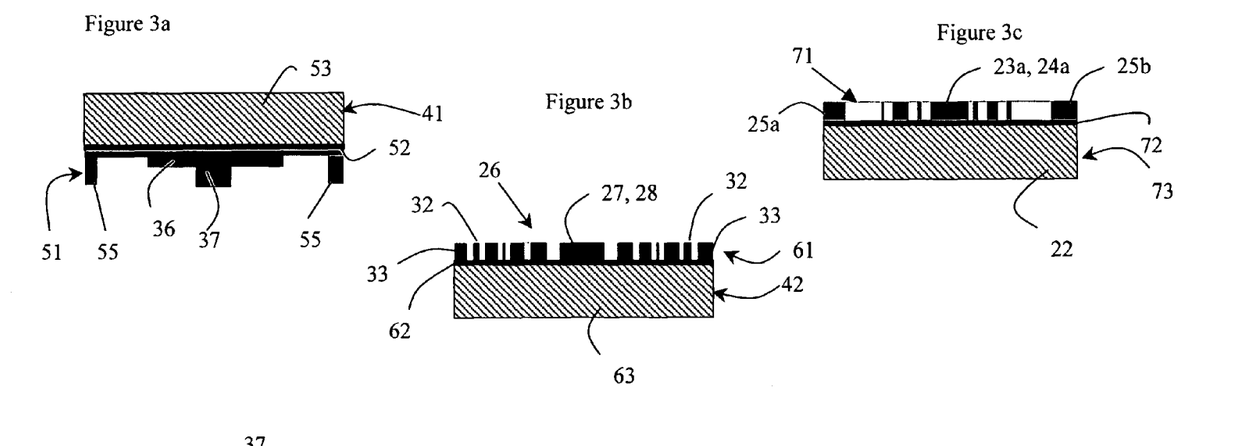
FIGS. 3a to 3f illustrate the method of assembly of the MEMS device of the present invention.

In FIG. 3a the mirror wafer 36 (or 16) is processed, e.g. etched, with the pedestal 37 (or 17) from the top layer of silicon 51 in the first SOI structure 41. An additional etching may be performed as shown, to form a stepped mirror as shown to reduce mirror mass moment of inertia without sacrificing mirror stiffness drastically. The initial etching process, to form the mirror/pedestal 16/17, does not extend down to the middle insulator layer 52, so that steps/bulkheads 55 will remain to facilitate further assembly. The bottom layer of silicon provides a handle wafer 53 for stiffening and support during assembly.

In FIG. 3b, the hinge/ground wafer 26 (or 6) is processed in parallel with the mirror wafer 36, in which tilt and roll hinges 28 and 32 (or 8 and 12), respectively, and the tilt and roll rotor comb ground elements 27 and 30 (or 7 and 11), respectively, are patterned, e.g. etched, from the top silicon layer 61 down to the insulator layer 62 of the second SOI structure 42. The remaining silicon layer provides a handle wafer 63 for structural support during assembly.

In FIG. 3c, the top layer 71 of the third SOI structure 43 can also be processed, e.g. etched down to the insulator layer 72, in parallel to the aforementioned first and second SIO structures 41 and 42, to define the tilt and roll stator comb electrodes 23a, 23b and 24a, 24b with electrode traces and electrode contacts 25a to 25d. For the first embodiment, the third SOI structure 43 can be replaced by a single layer of silicon, which has the tilt and roll electrostatic electrodes 3 and 4 patterned thereon. The bottom silicon layer 73 provides a handle wafer for further processing, and becomes the substrate 22, as hereinbefore described.

Figures 3D, 3E, 3F:
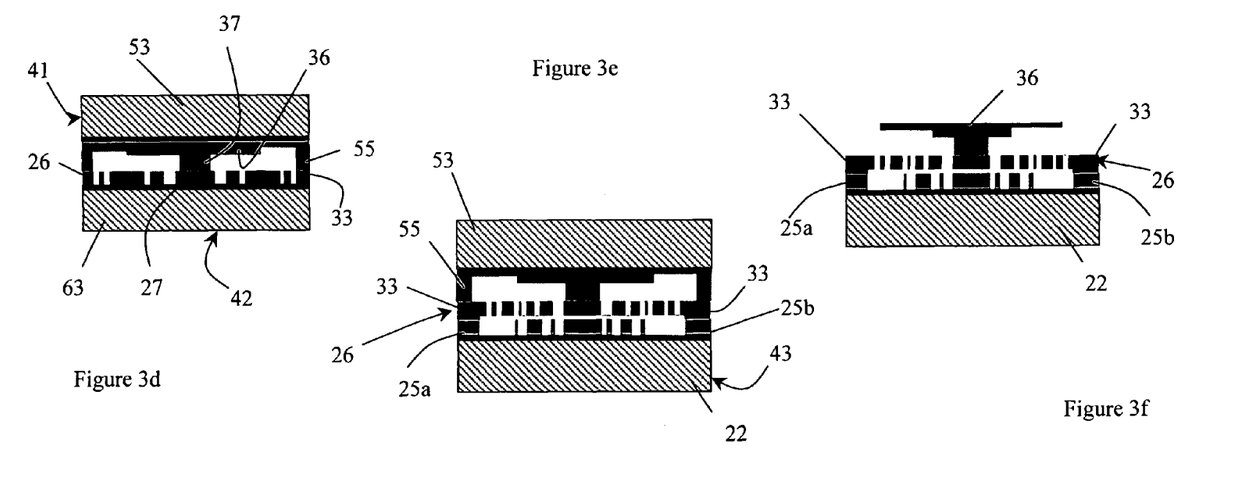

With reference to FIG. 3d, the first SOI structure 41 patterned with the mirror 36 and the second SIO structure 42 patterned with the hinge/ground wafer 26 (or 6) are fusion bonded together, whereby the pedestal 37 (or 17) is fixed to the center of the tilt ground element 27 (or 7). For alignment purposes, the bulkheads 55 are also connected to the mounting platforms 33 (or 13). The bonding alignment is relatively coarse.

After removing the handle wafer 63, e.g. by etching away the bottom and insulator layers 63 and 62, respectively, of the second SOI structure 42, the hinge/ground wafer 26 with the mirror 36 bonded thereto is bonded to the third SOI structure 43, i.e. the mounting platforms 33 are mounted on the raised electrode contacts 25a to 25d. Alternatively, the hinge/ground wafer 6 with the mirror 16 is bonded to raised supports 5a and 5b on the silicon substrate 1. The bonding alignment is relatively coarse.

Finally, the mirror handle wafer 53 is removed, and reflective metal is deposited on the mirror 36, followed by a release, e.g. deep reactive ion etching (DRIE), of the mirror 36 by removal of the bulkheads 55. The hinge layer 26 (or 6) provides tilt about two axes and is attached at its ends to supports 25a to 25d (or 5a and 5b) projecting from the substrate layer 22 (or 1). The advantages of the design of the present invention are that the hinge actuators 27, 30 for the micro-mirror are hidden below the mirror 36, thereby permitting a high fill factor, and that a large deflection can be obtained from the micro-mirror 36 mounted on the pedestal 37.

Furthermore, the preferred embodiment of the micro-mirror device of the present invention utilizes orthogonal vertical comb actuators to provide rotation about two axes. A first comb actuator, comprised of the tilt stators 23a and 23b and the tilt rotors 27, which provides tilt about a first axis, e.g.

Y-axis, has teeth planes which are parallel to the Y-Z plane. A second comb actuator, comprised of the roll stators 24*a* and 24*b* and the roll rotors 31*a* and 31*b*, which provides roll about X-axis, has actuator comb teeth planes that are parallel to X-Z plane. The orthogonal orientation of the two comb actuators has the advantage that rotation about the Z-axis is suppressed. This advantage is important in fabricating a piano micromirror array in which the micro-mirrors are closely spaced (high fill factor) with only an air gap between mirrors 36. Another feature of the comb actuators is that the teeth spacing is coarse (greater than 10 micron) thereby easing the alignment between the teeth on the rotor comb with respect to the teeth on the stator comb. This advantage eases the fabrication of the comb actuator by bonding together two layers in which one layer has the rotor comb and the other layer has the stator comb.

We claim:

1. A micro-electro-mechanical device comprising:
   a substrate with first and second supports extending upwardly therefrom;
   a tilting element pivotable about a first axis;
   first hinges, defining the first axis, extending from opposite sides of the tilting element;
   a rolling element, surrounding the tilting element and receiving the ends of the first hinges, pivotable about a second axis perpendicular to the first axis;
   second hinges, defining the second axis, extending from opposite ends of the rolling element, the outer ends of which are fixed to one of the first and second supports;
   a pedestal extending upwardly from the tilting element;
   a reflective body mounted on the pedestal;
   a first electrode mounted on the substrate along the second axis for rotating the tilting element and the reflective body about the first axis; and
   a second electrode mounted on the substrate including a first section along the second axis between the first electrode and the first support and a second section along the second axis between the first electrode and the second support, for rotating the rolling element, the tilting element and the reflective body about the second axis.

2. The MEMs device according to claim 1, wherein the second electrode also comprises an elongated portion extending between the first and second sections adjacent to the first electrode, and beneath a side of the rolling element.

3. The MEMs device according to claim 1, wherein the reflective body is wider than the rolling element, whereby the reflective bodies of adjacent MEMs device have only an air gap therebetween.

4. The MEMs device according to claim 1, wherein the first electrode comprises a first electrostatic comb drive including comb fingers extending laterally parallel to the first axis; and wherein the tilting element includes laterally extending beams offset with the comb fingers in the first electrode.

5. The MEMs device according to claim 4, wherein the comb fingers of the first electrode are symmetrical about the second axis.

6. The MEMs device according to claim 1, wherein the second electrode comprises second and third electrostatic comb drives, each including comb fingers extending longitudinally parallel to the second axis; and wherein the rolling element includes longitudinally extending beams offset with the comb fingers in the second and third electrostatic comb drives.

7. The MEMs device according to claim 1, wherein the rolling element comprises first and second crossbraces extending along opposite sides of the tilting element for receiving the ends of the first hinge, and first and second rolling structures fixed at opposite ends of the first and second crossbars providing ground electrode surfaces.

8. The MEMs device according to claim 7, wherein each of the first and second rolling structures comprises longitudinally extending beams forming a ground electrode disposed above the second electrode; and wherein the second electrode comprises comb fingers offset from the longitudinally extending beams.

9. The MEMs device according to claim 8, wherein the tilting element comprises first and second tilting structures, each comprised of laterally extending beams forming a ground electrode disposed above the first electrode; and wherein the first electrode comprises comb fingers offset from the laterally extending beams.

10. The MEMs device according to claim 1, wherein the tilt hinges comprise serpentine torsional hinges with an aspect ratio greater than ten, enabling rotation of the tilting element about the first axis and resisting rotation of the tilting element about the second axis; and
    wherein the roll hinges comprise serpentine torsional hinges with an aspect ratio greater than ten, enabling rotation of the rolling element about the second axis and resisting rotation of the rolling element about the first axis.

11. A method of manufacturing a MEMs device comprising:
    a) forming a substrate with first and second electrodes thereon;
    b) forming a middle section on a first wafer handle including:
       a tilting element pivotable about a first axis;
       first hinges, defining the first axis extending laterally from opposite sides of the tilting element;
       a rolling element, pivotable about a second axis perpendicular to the first axis, surrounding the tilting element, and receiving the ends of the first torsional hinge;
       second hinges, defining the second axis, extending longitudinally from opposite ends of rolling element; and
       a mounting platform fixed to each outer end of the second torsional hinge;
    c) forming a reflective body section including a pedestal and a reflective body on a second wafer handle;
    d) mounting the pedestal of the mirror section onto the tilting element of the middle section;
    e) removing the first wafer handle from the middle section;
    f) mounting the mounting platforms of the middle section onto opposite ends of the substrate section suspending the tilting and rolling elements above the first and second electrodes, respectively; and
    g) removing the second handle wafer of the reflective body section.

12. The method according to claim 11, wherein the first electrode is mounted on the substrate along the second axis for rotating the tilting element and the reflective body about the first axis; and a second electrode is mounted on the substrate and includes a first section along the second axis between the first electrode and the first support and a second section along the second axis between the first electrode and the second support, for rotating the rolling element, the tilting element and the reflective body about the second axis.

13. The method according to claim 11, wherein step f) includes fixing the mounting platforms of the middle section onto raised portions of the second electrodes.

14. The method according to claim 11, wherein step f) includes fixing the mounting platforms of the middle section onto raised portions of the substrate.

15. The method according to claim 11, wherein step a) includes forming the first electrode with a first electrostatic comb drive including comb fingers extending laterally parallel to the first axis; and wherein step b) includes forming the tilting element with laterally extending beams offset with the comb fingers in the first electrode.

16. The method according to claim 15, wherein step a) includes forming the comb fingers of the first electrode symmetrical about the second axis.

17. The method according to claim 11, wherein step a) includes forming the second electrode with second and third electrostatic comb drives, each including comb fingers extending longitudinally parallel to the second axis; and wherein step b) including forming the rolling element with longitudinally extending beams offset with the comb fingers in the second and third electrostatic comb drives.

* * * * *